United States Patent [19]

Willard et al.

[11] 3,899,637

[45] Aug. 12, 1975

[54] FREQUENCY SHIFT KEYED COMMUNICATIONS DEVICE

[75] Inventors: Frank G. Willard, Pitcairn, Pa.; Earl T. Farley, Altamonte Springs, Fla.

[73] Assignee: Westinghouse Electric Corporation, Pittsburgh, Pa.

[22] Filed: Feb. 8, 1974

[21] Appl. No.: 440,935

[52] U.S. Cl. .................................. 178/59; 178/66 R

[51] Int. Cl.$^2$ .................................. H04L 5/14

[58] Field of Search ............ 178/58 R, 59, 66 R, 88; 325/163, 320; 179/2 DP

[56] References Cited

UNITED STATES PATENTS

| | | | |
|---|---|---|---|
| 3,566,033 | 2/1971 | Young | 178/66 R |
| 3,579,110 | 5/1971 | Hauber | 178/66 R |
| 3,623,075 | 11/1971 | Bench | 178/66 R |
| 3,746,794 | 7/1973 | Stifle | 325/320 |
| 3,773,979 | 11/1973 | Kirk | 179/15 FD |
| 3,775,561 | 11/1973 | Guckel | 178/58 R |

*Primary Examiner*—David L. Stewart
*Attorney, Agent, or Firm*—E. F. Possessky

[57] ABSTRACT

A full duplex frequency shift keyed communications device for bit serial transmission and reception of digital data using a communication channel comprising a two-conductor transmission line is disclosed. Each device comprises a transmitter, a receiver and a transmit/receive separator. A plurality of such devices can be commonly connected to a single communication channel wherein two such devices may communicate with each other simultaneously, or one such device may transmit while the remaining devices selectively receive the data that is transmitted. The transmitter, which includes a read-only memory and a digital to analog converter, accepts data from a real-time data processor and generates a one-cycle sinusoidal output signal in response to each transmission datum bit. If no transmission datum is available, the transmitter generates a quiescent output signal, permitting the transmission line to be used by the other devices. The transmit/receive separator cooperates with the transmission line so that the transmission line composite signal is the analog sum of the various signals being transmitted; consequently, full duplex extraction of a received signal is accomplished in the transmit/receive separator by subtracting the transmitted signal from the line conposite signal. The receiver employs a digital discrimination technique to determine the bit value corresponding to a received signal. The accuracy of the digital technique is substantially immune to phenomena such as phase distortion and oscillator frequency drift.

19 Claims, 10 Drawing Figures

FREQUENCY SHIFT KEYED COMMUNICATIONS DEVICE

BACKGROUND OF THE INVENTION

In industrial plants such as steel mills, refineries, and power stations, digital compouters frequently perform data collection and control functions. In a steel plant for example, one digital computer may function with respect to the blast furnace, another computer may be related to basic oxygen furnace data collection and process control, another computer may be related to the continuous casting machines, while other computers may perform data collection and control functions with respect to the rolling mill. While each computer comprises a central bank of digital information, it is useful and desirable to communicate digital data between the various computers, thereby enabling the respective processes to cooperate systematically and more effectively. In these environments the communicating machines generally are separated by moderate physical distances, and the necessary data transmission rates usually can be achieved without multiple transmission channels or bit parallel transmission.

Under such circumstances it is desirable to provide a single, inexpensive communication channel and the cooperative communications device which enables an associated data processor to transmit and receive digital data through the communication channel. One inexpensive communication channel readily available consists of an ordinary two wire transmission line, composed of light gauge conductors. Because of line resistance such a channel is necessarily limited in length, but length limitations ordinarily do not obviate the application of the channel when the communications devices are in close proximity as within an industrial plant.

In frequency shift keying, a datum bit is encoded for transmission as a sinusoidal signal, also referred to as a tone, the frequency of which represents the bit value. It is sometimes the practice to change the frequency of the transmitted signal as the signal crosses the zero axis, which eliminates abrupt changes between each transmitted signal, thus improving the reliability in detecting each received signal. Bit serial transmission typically reduces the hardware scope of the communications device by reducing the number of constant frequency signal generators to endode data bits for transmission. Although data communication rates are typically lower when bit serial transmission is employed rather than bit parallel, the bit serial communication rates can be higher when only one sinusoidal signal cycle is used to represent a bit rather than a plurality of cycles. An increase in communication rates results when the bit serial communications device transmits and receives data simultaneously.

In a communications system comprising a plurality of communications devices commonly connected to a single communication channel, it is desirable that communications device cease transmitting a signal when there is no data for transmission. Then the channel is accessible to other such devices to which transmission data is available.

Bit serial transmitters have been proposed for generation of a single cycle sinusoidal signal having a predetermined frequency in accordance with a datum bit value, wherein the frequency is changed at zero axis crossings of the generated signal. Such transmitters employ a plurality of signal generators designed to turn on in the same predetermined phase in order to change frequencies smoothly on zero crossings. Other transmitters employ constant frequency square wave signal generators, using band pass filters to filter low order harmonic frequencies from the generated square wave signals, thereby producing the sinusoidal output signals. These transmitters typically respond to a no datum condition by generating sinusoidal signals of a predetermined frequency which renders them impractical for utilization with a single communication channel.

Heretofore, receivers were used for serial processing of sinusoidal signals having predetermined frequencies which are changed at zero axis crossings, and operate to generate output signals in accordance with the datum bit values corresponding to the frequencies of the received signals. Phenomena such as phase distortion and oscillator frequency drift may affect the zero axis crossings of the received signals, which in turn may influence the accuracy with which the received signal frequencies are detected, and thus degrade the reliability of communication.

SUMMARY OF THE INVENTION

The present invention relates broadly to a full duplex frequency shift keyed communications device comprising a transmitter, a receiver, and a transmit/receive separator. The transmitter accepts transmission datum bits serially from its associated data processor. In response to a transmission datum, the transmitter generates a transmit tone comprising one cycle of a repetitive signal, controlling the frequency of the tone according to the datum bit value. The associated transmit/receive separator applies each generated transmit tone across the conductors of a two-conductor transmission line, which carries the transmit tone for reception by other such devices at diverse locations. When a plurality of transmit/receive separators simultaneously apply transmit tones to the transmission line a composite signal is developed across the conductors which is the analog sum of the transmit tones. When one transmit/receive separator applies a transmit tone for reception by another transmit/receive separator, the other transmit/receive separator subtracts whatever tone it is transmitting from the line composite signal. The net signal is the received tone which is connected to the receiver. The receiver detects the frequency of each received tone and generates an output signal representing the bit value of the tone, for subsequent acquisition by the associated data processor.

In one aspect the present invention relates to such communications device wherein the transmitter includes a counter, a read-only memory, and a digital to analog converter. The counter counts oscillations of a clock signal, counting upwardly until full, resetting, and counting upwardly again. The counter output signals successively address locations of the read-only memory, which stores a digital input word at each memory location. When a memory location is addressed the digital input word stored at the addressed location is conducted to the input of the digital to analog converter, which generates an output signal of a voltage lever determined by the digital input word, and of a time duration equal to the period of the oscillating clock signal. The digital input words are stored in a predetermined pattern to cause the output signals of the digital to analog converter to stepwise approximate one cycle of a repetitive signal when all memory locations are addressed once in succession. One such cycle is generated in response to each of a series of datum bits. The period of each cycle is determined by a controller, which governs the frequency of the oscillating clock signal at one of two distinct values according to the bit value of the corresponding datum.

In another aspect the present invention relates to such communications device wherein the transmit/receive separator includes a current driving amplifier, to generate a current in a first transformer winding, the generated current having a constant proportionality with a transmit tone. A second transformer winding connected across a two-conductor transmission line with characteristic impedance terminations generates a voltage signal of the same frequency as the transmit tone, whereby the transmit tone is carried by the line to other such transmit/receive separators which may receive the tone. When a plurality of such transmit/receive separators are commonly connected to the transmission line, the composite voltage across the conductors is the analog sum of the transmit tones to which the transmit/receive separators respond. If two transmit/receive separators simultaneously transmit tones to each other, a second amplifier in each transmit/receive separator subtracts the tone being transmitted from the transmission line composite voltage, to separate the tone being received.

In another aspect, the present invention relates to such communications device wherein the receiver includes an axis crossing detector to detect the period of each received tone. During a received tone period a counter counts oscillations of a clock signal having a fixed frequency predetermined relative to the clock frequencies used in the transmitter. At the end of a received tone, the state of a predetermined counter bit determines the bit value of the received tone. Increasing the separation of the transmitter clock signal frequencies raises the immunity of the receiver to errors which may result from phenomena such as clock signal frequency drift and phase shift, which effect the zero axis crossings of a received tone.

DETAILED DESCRIPTION

Figure 1:
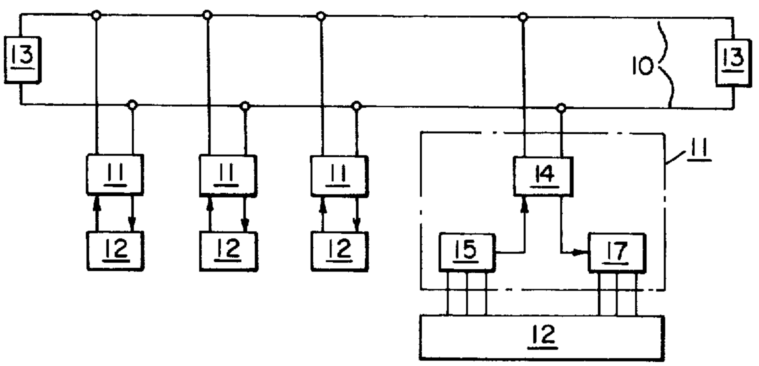
FIG. 1 is a block diagram of a communications device according to one embodiment of the present invention connected to a two-conductor transmission line with like communications apparatus.

Referring to FIG. 1 a plurality of communications apparatus or modems 11 are shown connected at spaced locations to a two-conductor transmission line 10. Each modem 11 serially transmits data bits from its associated digital data processor 12 to other modems 11 for use in their associated digital data processors 12 and each modem 11 receives datum bits serially for use in its associated digital data processor 12. The digital data processors 12, which form no part of the present invention, may be any suitable data processor capable of generating bits of digital information serially for transmission and serially receiving bits of information for processing. When more than two data processors 12 and associated modems are used, it is assumed that functions such as designation of sending and receiving modems are included in the data processor. Also such data processors 12 are assumed when used with the present embodiment of the invention, to perform any required reliability checks of data and to form and decompose words from the serial bits.

Each of the modems 11 is full duplex, i.e., each modem 11 is capable of sending and receiving simultaneously. The modem 11 according to the present embodiment of the invention as described in detail hereinafter, may send and receive information to and from another modem 11 simultaneously and transmit information for reception by any number of other modem 11 provided that no other modem 11 is transmitting at the same time.

The transmission line 10, to which each of the modems 11 is adapted to be connected, may be a twisted pair of conductors the particular gauge of which would vary in accordance with the distance the information is to be communicated, because of resistance. The line 10 is terminated at each end by a characteristic impedance 13 in order to eliminate reflection of traveling waves so that such line 10 appears as a pure resistance to each modem 11 for reasons discussed in detail hereinafter.

Each modem 11 comprises a transmitter 15, a receiver 17, and a transmit/receive separator 14. The transmitter 15 accepts datum bits serially from its associated data processor 12, and in response to each such datum the transmitter 15 generates one cycle of a sinusoidal signal referred to as a tone. The transmitter 15 controls the period or frequency of the generated datum according to the bit value of the corresponding datum. Tones generated by the transmitter 15 are conducted to the associated transmit/receive separator 14. Each tone causes the transmit/receive separator 14 to generate a voltage signal across the conductors of transmission line 10. The generated voltage signal bears a constant proportionality to the tone. Thus a tone generated by the transmitter 15 is carried by the transmission line 10 to other modems 11 which may receive the tone. The transmit/receive separator 14 also separates from a composite voltage signal which may be across the conductors of transmission line 10, a tone to be received by its respective modem 11. From the transmit/receive separator 14 a received tone is conducted to the associated receiver 17, which detects the period of the received tone, and generates a signal representing the bit value corresponding to the received tone, for subsequent acquisition by its associated data processor 12.

TRANSMIT/RECEIVE SEPARATOR

Figure 2:
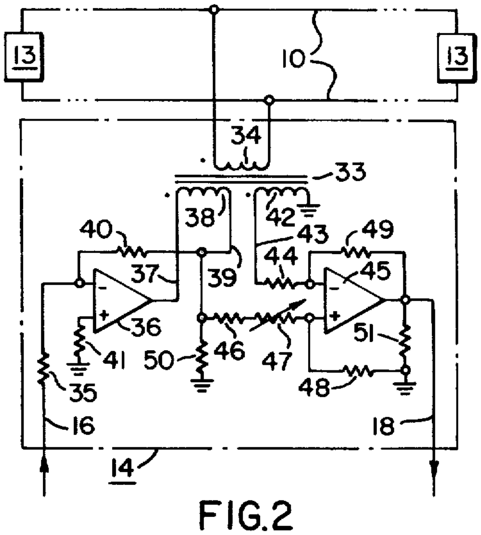
FIG. 2 is a schematic diagram of a transmit/receive separator according to one embodiment of the present invention.

Referring to FIG. 2 the transmit/received separator 14 includes an isolation transformer 33 which has a primary winding 34 connected across the transmission line 10, and two secondary windings. A transmit tone generated by the transmitter 15 (see FIG. 4) is transmitted on line 16 through input resistor 35 to a negative input terminal of an operational amplifier 36. The output signal of the amplifier 36 is connected by line 37 to the positive sense side of secondary winding 38 of the transformer 33. The other side of winding 38 is connected by line 39 through resistor 40 to the negative input of amplifier 36. The positive input of amplifier 36 is connected to ground through resistor 41.

A transmit tone on the line 16 is one cycle of a sinusoidal voltage signal generated by the transmitter 15. Because the amplifier 36 is connected so that the negative input operates at virtual ground, the current in the input resistor 35 varies sinusoidally, in constant proportion to the sinusoidal voltage signal on the line 16. The current in resistor 40 is identical with that in resistor 35; in other words the current in resistor 40 varies sinusoidally and in the same constant proportion to the signal on the line 16 as the current in input resistor 35. Because resistors 35 and 40 have equal resistance characteristics, the signal on the line 39 is therefore a sinusoidal voltage of the same frequency of the transmit tone, but having the opposite phase of the transmit tone. The resistance characteristic of resistor 50 is considerably smaller than the resistance of resistors 35 and 40; therefore the current in resistor 50 varies sinusoidally at the same frequency as the transmit tone, but the amplitude of the current in resistor 50 is much greater than the current amplitude in resistors 35 and 40, due to the smaller resistance of resistor 50. Substantially all of the current in resistor 50 is generated by the amplifier 36 and conducted through the series path of the line 37, the winding 38, the line 39, and the resistor 50. The current in the winding 38 is therefore in constant proportion to the signal on the line 16. A transmit tone on the line 16 causes the current in the winding 38 to vary sinusoidally with the frequency of the transmit tone. Because transmission line 10 is terminated at each end in the characteristic impedance 13, the effect of the transmission line 10 on the winding 34 is that of a pure resistance. The winding 34 generates a sinusoidal current of the same frequency as the transmit tone, and the current of winding 34 is conducted by the effective resistance of the transmission line 10, so that a sinusoidal voltage signal is generated between the two terminals of the winding 34 of the same frequency of the transmit tone on the line 16. In response to a transmit tone on the line 16 generated by the transmitter 15, the transmit/receive separator 14 applies a sinusoidal voltage signal across the conductors of the transmission line 10. The frequency of the applied signal is the same as the frequency of the transmit tone.

Referring to FIG. 1, a plurality of the transmit/receive separators 14 may simultaneously respond to transmit tones generated by the transmitters 15; then the composite voltage signal across the conductors of the transmission line 10 is proportional to the algebraic sum of the transmit tones, as discussed hereinafter.

The negative sense side of winding 42 of the transformer 33 is connected to ground. The positive sense side of the winding 42 is connected by line 43 through input resistor 44 to a negative input of operational amplifier 45. The transformer winding 38 is connected by the line 39 through input resistor 46 and trimming resistor 47 to the positive input of the amplifier 45. The positive input of the amplifier 45 is connected to ground through resistor 48. Feedback resistor 49 is connected between the output of the amplifier 45 and the negative input. Resistor 51 is connected to ground to establish desired output loading of the amplifier 45. The output signal of the amplifier 45, a received tone, is connected by line 18 to the receiver 17 (see FIG. 6).

A voltage signal on the line 43 is proportional to a composite voltage signal across the conductors of the transmission line 10. As heretofore explained, the signal on the line 39 is negative of the signal on the line 16. Because the amplifier 45 is connected to sum the voltages on the lines 39 and 43, the amplifier 45 subtracts the signal on the line 16 from a composite voltage signal across the transmission line 10, to generate the output signal on the line 18. A signal on the line 18 is a received tone. Because the amplifiers 36 and 45 function concurrently, the transmit/receive separator 14 is capable of full duplex operation, wherein a signal is applied across the conductors of the transmission line 10 in response to a transmit tone on the line 16, while a received tone on the line 18 is separated simultaneously from the composite voltage signal across the conductors of the transmission line 10.

Referring to FIG. 1, one transmit/receive separator 14 may transmit a tone, while other transmit/receive separators 14 receive the transmitted tone. In the transmitting modem the transmit/receive separator 14 subtracts the transmit tone from the voltage signal across the conductors of the transmission line 10; however, the signals are identical and the transmit/receive separator 14 of the transmitting modem generates an output signal on the line 18 that is constant at zero volts, and no tone is received. The trimming resistor 47 permits optimum adjustment of the amplifier 45 to assure that the signal on the line 18 is substantially zero in this instance. The transmit/receive separator 14 of a receiving modem separates a received tone of the same frequency as the transmitted tone, because all transmit tones are constant at zero volts except that of the transmitting modem. Therefore, the transmit/receive separator 14 of a receiving modem subtracts zero voltage signal from the voltage signal across the transmission line 10, thereby separating the transmitted tone as the received tone signal on the line 18.

Figure 3A:
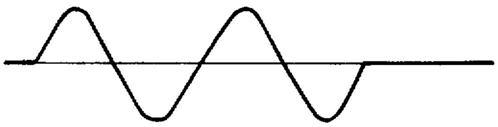
FIG. 3 graphically illustrates signals occurring when two transmit/receive separators according to one embodiment of the present invention simultaneously transmit tones for reception by each other.
Figure 3B:
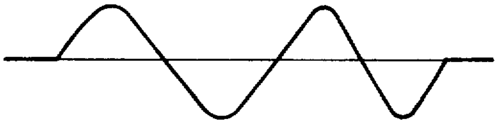
Figure 3C:
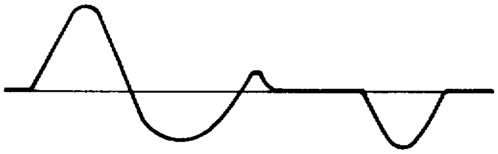
Figure 3D:
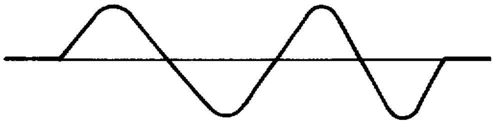
Figure 3E:
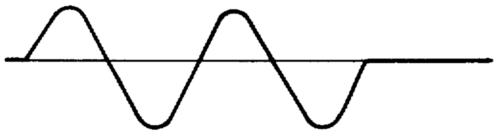

In another mode of operation two transmit/receive separators 14 in FIG. 1 may simultaneously transmit tones for reception by each other. FIG. 3 graphically illustrates various signals which arise when two such transmit/receive separators simultaneously transmit tones. Time is the horizontal acess of all graphs of FIG. 3 and vertically coincident horizontal axis points represent the same instant of time. FIG. 3A illustrates two higher frequency tones to be transmitted by the first transmit/receive separator 14, preceeded and followed by intervals of quiescence. FIG. 3B illustrates tones to be transmitted by the second transmit/receive separator 14; a lower frequency tone is followed by a tone of higher frequency and thereafter by an interval of quiescence. FIG. 3C shows the composite voltage signal across the transmission line 10 which results when the first and second transmit/receive separators 14 respond to the transmit tones of FIG. 3A and 3B respectively. FIG. 3C is obtained by algebraicly adding values of the signals of FIG. 3A and FIG. 3B at similar instants of time, assigning points above a horizontal axis a positive algebraic sense and points below a horizontal axis a negative algebraic sense. FIG. 3D shows the received tones separated by the first transmit/receive separator 14 by subtracting the signal of FIG. 3A from the composite signal of FIG. 3C. The tones received by the first transmit/receive separator 14 are those of FIG. 3B, transmitted by the second transmit/receive separator. FIG. 3E shows the received tones separated by the second transmit/receive separator 14 by subtracting the signal of FIG. 3B from the composite signal of FIG. 3C. The received tones separated by the second transmit/-receive separator 14 are the tones of FIG. 3A, transmitted by the first transmit/receive separator 14.

If three transmit/receive separators 14 in FIG. 1 transmit tone simultaneously, the composite voltage signal across the conductors of the transmission line 10 is the sum of three transmit tones, and no transmit/-receive separator 14 is able to separate a received tone from the composite voltage signal, as separation of the received tone requires subtraction of two transmit tones from the composite voltage signal, rather than one. When two transmit/receive separators 14 in FIG. 1 simultaneously transmit tones, a third transmit/-receive separator 14 cannot separate a received tone, as the composite voltage signal across the transmission line 10 is the sum of two transmit tones, neither of which is connected to the third transmit/receive separator 14. If the communication is restricted to two transmit/receive separators, as set forth above, reliable transmission and reception of data results and the full duplex capability of the transmit/receive separators is realized.

TRANSMITTER

Figure 4:
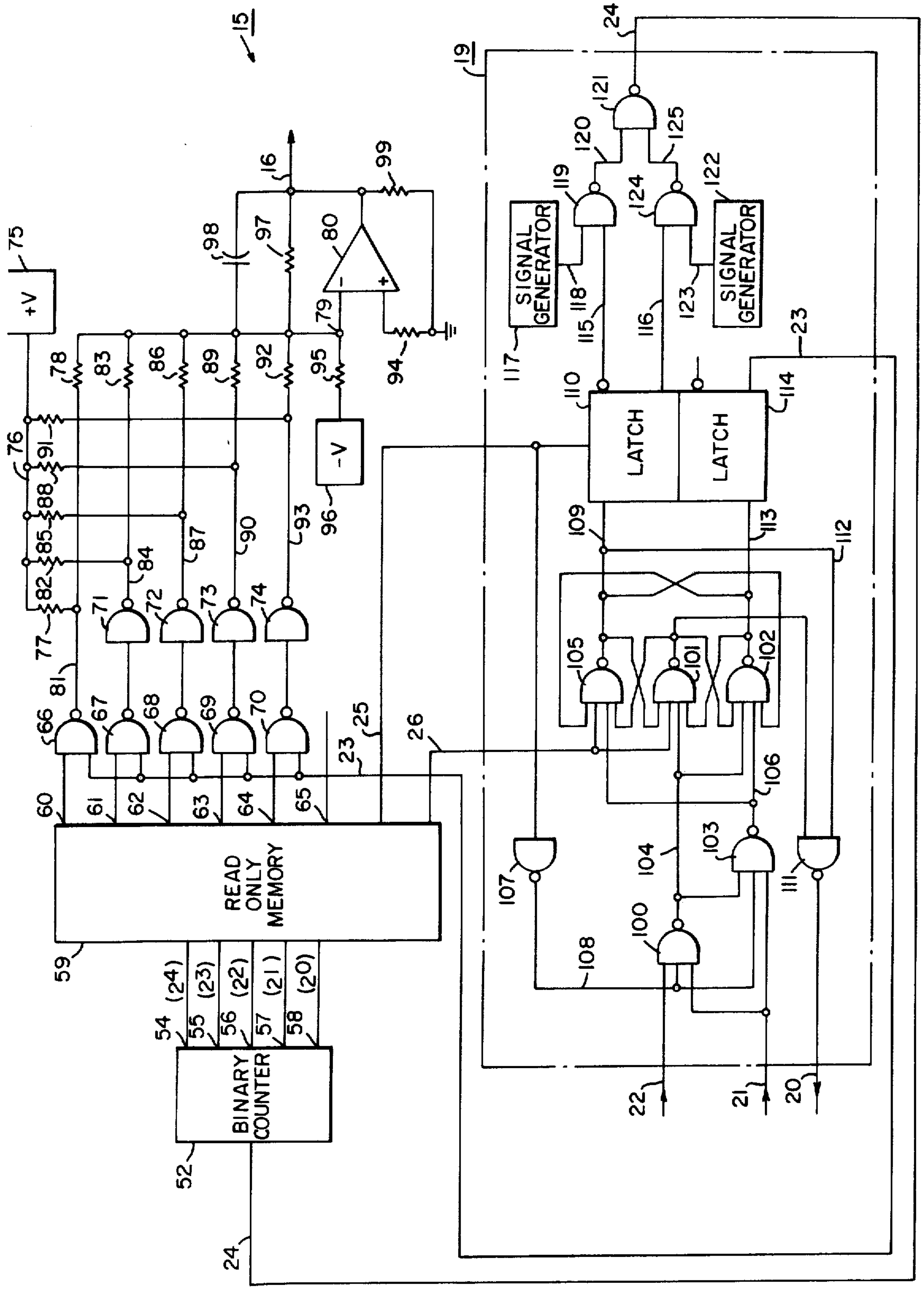
FIG. 4 is a schematic diagram of a transmitter according to one embodiment of the present invention.

Referring to FIG. 4 the transmitter 15 includes a tone controller portion 19 which accepts datum bits in the form of pulse signals on lines 21 and 22 from its associated data processor 12 (see FIG. 1), and according to the value of an accepted bit selects one of two fixed frequency clock signals for transmission by line 24 to the tone synthesizer portion of the transmitter 15. In response to the accepted datum bit, the tone synthesizer generates a transmit tone on output line 16, which comprises one cycle of a sinusoidal voltage signal, beginning and ending at zero volts. The frequency of the transmit tone generated on the line 16 is determined by the frequency of the clock signal on the line 24, selected by the tone controller 19 in accordance with the value of the transmission datum. When the associated data processor 12 has no datum for transmission, the absence of a pulse generated by the data processor 12 on the line 21 causes the tone controller 19 to generate a signal on line 23 to inhibit generation of a transmit tone on the line 16.

Figure 5:
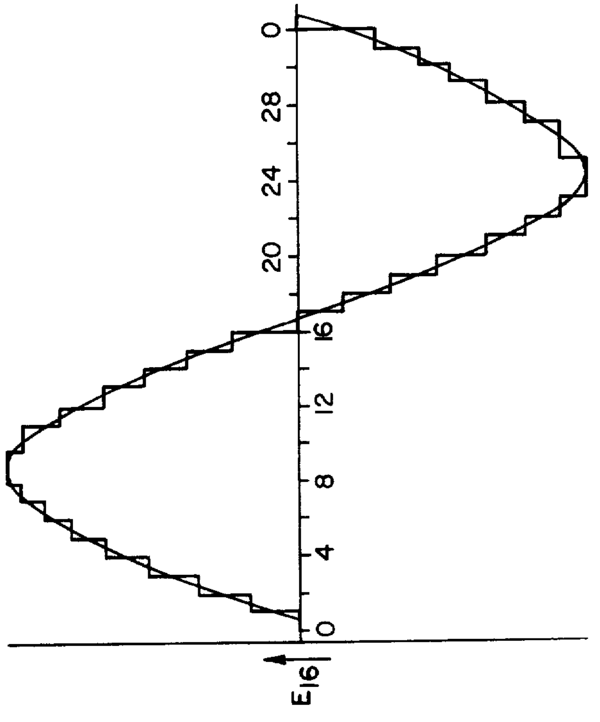
FIG. 5 illustrates a stepwise approximation of a sinusoidal tone generated by a transmitter according to one embodiment of the present invention.

The tone synthesizer portion of the transmitter 15 includes a counter 52, a read-only memory 59, a configuration of NAND gates, and a digital to analog converter. The counter 52 counts oscillations of the clock signal on the line 24. The counter 52 is a five-bit counter, arranged to count upwardly until 32 oscillations are counted, thereafter resetting and counting upwardly again. The output signals of the counter 52 on lines 54 through 58 represent the number of oscillations counted. The lines 54 through 58 are connected to the read-only memory 59, which has 32 locations, each of which is addressed by one of the 32 oscillation counts generated by the counter 52. When a location of the read-only memory 59 is addressed by an oscillation count on the lines 54 through 58, a predetermined digital input word stored at the addressed location is generated on output lines 60–64 to cause the digital to analog converter to generate an output signal on the line 16 of a voltage level determined by the digital input word. As the counter 52 counts 32 successive oscillations of the clock signal on the line 24, the 32 locations of the read-only memory 59 are addressed in sequence, and the predetermined pattern of digital input words stored by the read-only memory 59 causes the digital to analog converter to generate a sequence of 32 output signals on the line 16 to stepwise approximate one sinusoidal voltage cycle, as shown in FIG. 5. The digital to analog converter includes a filter capacitor 98 to smooth the stepwise approximate sinusoid, thereby generating the transmit tone. Upon completion of the generation of one such transmit tone, the tone controller 19 selects a clock signal frequency for generation of the next transmit tone, provided that a datum has been presented for transmission on the lines 21 and 22 by the associated data processor 12. If no such datum is present, the tone controller 19 generates a signal on the line 23 to cause the output signal on the line 16 to remain constant at zero volts.

At the start of generation of a transmit tone, the read-only memory 59 generates a pulse signal which is conducted by line 26 to the tone controller 19. In response the tone controller 19 generates a signal connected by line 20 to the associated data processor 12 to request the next datum bit for transmission. If the data processor 12 has a datum for transmission, it generates a pulse signal on the line 21. If the datum value is one the data processor 12 generates a pulse signal on the line 22 concurrently with the pulse on the line 21. If the datum value is zero, the data processor 12 generates a pulse only on the line 21. If no datum is available, the data processor 12 does not generate a pulse on the line 21.

In the tone controller 19, NAND gates 101, 102 and 105 comprise a three-state memory for storing three datum conditions represented by the signals on the lines 21 and 22, namely datum one, datum zero, and no datum. At the end of generation of a transmit tone, the read-only memory 59 generates a pulse connected to the tone controller 19 by line 25. In response the tone controller 19 transfers the datum condition from the three-state memory to latches 110 and 114. Signal generators 117 and 122 generate clock signals which oscillate at distinct constant frequencies. When the datum condition is transferred to the latches 110 and 114, one of the clock signals is selected in accordance with the datum condition for transmission to the counter 52 by the line 24, and the tone synthesizer generates a transmit tone by counting oscillations of the selected clock signal. Since the frequency of the transmit tone is determined by the frequency of the clock signal whose oscillations are counted during generation of the tone, the datum condition stored by the latches 110 and 114 governs the frequency of the generated transmit tone. If the latches store a no datum condition, a signal connected by the line 23 to the tone synthesizer causes the output signal of the digital to analog converter on the line 16 to remain constant at zero volts.

Immediately after generating the pulse signal on the line 25 to cause transfer of the datum condition from the three-state memory to the latches 110 and 114, the read-only memory 59 generates a pulse on the line 26 to cause the tone controller 19 to generate a signal on the line 20 to request the associated data processor 12 to furnish the next transmission datum. As heretofore explained the condition of the next transmission datum is represented by signals on the lines 21 and 22 and stored by the three-state memory comprising NAND gates 101, 102, and 105.

In more detail, the output lines 54–58 of the counter 52 are numbered in order of increasing binary significance; i.e., the signal level on the output line 54 represents the state of the counter bit corresponding to $2^0$, while the signal level on the output line 58 represents the state of the counter bit corresponding to $2^4$. When a location of the read-only memory 59 is addressed by the output signals of the counter 52, the binary content of the addressed location is represented by signals on output lines 60–65, 25, and 26. Line 60 is connected to NAND gate 66; line 61 to NAND gate 67; line 62 to NAND gate 68; line 63 to NAND gate 69; and line 64 to NAND gate 70. Line 65 is not used. The lines 25 and 26 are connected to the tone controller 19. The line 23 is commonly connected to the NAND gates 66-70. The output of NAND gate 67 is connected to NAND gate 71; that of NAND gate 68 to NAND gate 72; that of NAND gate 69 to NAND gate 73; and that of NAND gate 70 to NAND gate 74. The NAND gates 66, and 71–74 are of necessity the open-collector type, but this restriction does not apply to the remaining NAND gates shown in FIG. 4.

The signals on the lines 54–58 constitute a five-bit binary number which represents the number of oscillations of the clock signal on the line 24 counted by the counter 52. As successive oscillations of the clock signal are counted, the signals on the lines 54–58 change through a sequence of 32 unique states, each state representing a five-bit binary number. When two oscillations have been counted (after the counter 52 resets) the binary number is 00010, wherein the signal on the line 57 is "high" while the signals on the remaining output lines of the counter 52 are "low." As another example, when 23 oscillations have been counted the binary number is 10111, wherein the signals on all the output lines of the counter 52 are high except the signal on the line 55, which is low.

Referring to the table below, the column headed "binary address" lists the sequence of binary numbers represented by the signals 54–58 as 32 successive oscillations of the clock signal 24 are counted (after the counter 52 resets). The column headed "oscillation count" lists the decimal number of oscillations counted to cause the counter output signals on the lines 54–58 to represent the corresponding binary number in the binary address column. Upon resetting the binary number is 00000 corresponding to an oscillation count of zero. Each succeeding oscillation of the cloak signal on the line 24 causes the oscillation count to increase by one, and the counter 52 generates signals on the lines 54–58 representing the corresponding binary number. The thirty-second such oscillation causes the counter 52 to reset. The respective high and low signal levels on lines 54–58 change an occurrence of an oscillation of the clock signal on the line 24; in other words, the output signals of the counter 52 remain in their respective high and low states representing a binary number for a time interval equal to the period of the clock signal on the line 24.

TABLE I

| Binary Address | Oscillation Count | Word | Voltage Value |
|---|---|---|---|
| 00000 | 0 | 00000000 | 0. |
| 00001 | 1 | 11110001 | + 30/16 |
| 00010 | 2 | 11100001 | + 60/16 |
| 00011 | 3 | 11010001 | + 90/16 |
| 00100 | 4 | 11000001 | +120/16 |
| 00101 | 5 | 10110001 | +150/16 |
| 00110 | 6 | 10100001 | +180/16 |
| 00111 | 7 | 10010001 | +210/16 |
| 01000 | 8 | 10001001 | +225/16 |
| 01001 | 9 | 10010001 | +210/16 |
| 01010 | 10 | 10100001 | +180/16 |
| 01011 | 11 | 10110001 | +150/16 |
| 01100 | 12 | 11000001 | +120/16 |
| 01101 | 13 | 11010001 | + 90/16 |
| 01110 | 14 | 11100001 | + 60/16 |
| 01111 | 15 | 11110001 | + 30/16 |
| 10000 | 16 | 00000001 | 0. |
| 10001 | 17 | 00010001 | − 30/16 |
| 10010 | 18 | 00100001 | − 60/16 |
| 10011 | 19 | 00110001 | − 90/16 |
| 10100 | 20 | 01000001 | −120/16 |
| 10101 | 21 | 01010001 | −150/16 |
| 10110 | 22 | 01100001 | −180/16 |
| 10111 | 23 | 01110001 | −210/16 |
| 11000 | 24 | 01111001 | −225/16 |
| 11001 | 25 | 01110001 | −210/16 |
| 11010 | 26 | 01100001 | −180/16 |
| 11011 | 27 | 01010001 | −150/16 |
| 11100 | 28 | 01000001 | −120/16 |
| 11101 | 29 | 00110001 | − 90/16 |
| 11110 | 30 | 00100001 | − 60/16 |
| 11111 | 31 | 00010011 | − 30/16 |
| 00000 | 0 | 00000001 | 0. |

The output signals of the counter 52 are connected to address the locations of the read-only memory 59. Each location of the read-only memory 59 has a five-bit binary address corresponding to one of the binary numbers in the binary address column. As 32 oscillations of the clock signal on the line 24 are counted, the locations of the read-only memory 59 are addressed once in sequence. When the address of a particular memory location is generated by the output signals of the counter 52, the readonly memory 59 generates output signals on lines 60–65, 25, and 26 to represent predetermined eight-bit binary words stored at the addressed location. The column headed "word" lists the eight-bit word stored at the location of the read-only memory 59 whose address appears in the corresponding binary address column. The read-only memory 59 output lines which represent the word stored at an addressed location are indicated below the word column. As an example, the signal on the output line 60 represents the first bit of a stored word, the signal level on the line 60 being "high" when the bit is one and "low" when the bit is zero. The first five bits of a word constitute a digital input word to control the output signal of the digital to analog converter on the line 16. The last two bits of a word are represented by signals on the output lines 25 and 26; these bits generate the pulse signals which synchronize the tone controller 19, as heretofore explained.

As the counter 52 counts 32 oscillations of the clock signal on the line 24, the counter generates the sequence of binary numbers shown in the binary address column. Continued oscillation of the clock signal on the line 24 causes the counter 52 to generate the binary number sequence repetitively, generating the sequence once in response to 32 successive oscillations of the clock signal. Thus, the 32 locations of the read-only memory 59 are addressed sequentially and repetitively by the output signals of the counter 52 on the lines 54-58. When the 32 locations of the read-only memory 59 are addressed in one such sequence the read-only memory 59 generates on the output lines 60-64 the sequence of 32 digital input words shown in the word column. The sequence of 32 digital input words causes the digitial to analog converter to generate a sequence of 32 voltage signals on the output line 16 to stepwise approximate one sinusoidal voltage signal beginning and ending at zero volts, as in FIG. 5. The voltage level on the output line 16 is determined by the digital input word on the lines 60–64 as hereinafter explained. The column of the table headed "voltage value" lists the voltage level in volts of the output signal on the line 16 which results when the corresponding digital input word of the word column is generated on the lines 60–64. A filter capacitor 98 in the digital to analog converter smoothes the stepwise approximate signal, to generate a transmit tone. As one transmit tone is generated per 32 successive oscillations of the clock signal on the line 24, the frequency of the generated transmit tone is determined by the frequency of the clock signal.

A read-only memory of the same description as the read-only memory 59 and instructions for storing binary words at the memory locations are set forth in detail in "The TTL Date Book for Design Engineers," published by Texas Instruments Inc., which has been publicly available more than one year prior to the filing of this application.

In the digital to analog converter a constant voltage source 75 is connected to maintain a bus 76 at 15 volts positive. Resistors 77 and 78 of value R ohms are connected in series between the bus 76 and a negative input 79 of an operational amplifier 80. The output of NAND gate 66 is connected to the junction of the resistors 77 and 78 by line 81. Resistors 82 and 83 of value 2R ohms are connected in series between the bus 76 and the input terminal 79. The output of NAND gate 71 is connected to the junction of the resistors 82 and 83 by line 84. Resistors 85 and 86 of value 4R ohms are connected in series between the bus 76 and the input terminal 79. The output of NAND gate 72 is connected to the junction of the resistors 85 and 86 by line 87. Resistors 88 and 89, of value 8R ohms, are connected in series between the bus 76 and the input terminal 79. The output of NAND gate 73 is connected to the junction of the resistors 88 and 89 by line 90. Resistors 91 and 92, of value 16R ohms, are connected in series between the bus 76 and the input terminal 79. The output signal of NAND gate 74 is connected to the junction of the resistors 91 and 92 by line 93.

The positive input of the operational amplifier 80 is connected to ground through a resistor 94. The input 79 of the amplifier 80 operates at virtual ground. A resistor 95 of value 2R ohms is connected between the input terminal 79 and a constant voltage source 96, which maintains a constant voltage signal of 15 volts negative. A feedback resistor 97 is of value 2R ohms. The feedback capacitor 98 is of value $1/(19200\pi R)$ farads. A resistor 99 connects the output of the amplifier 80 to ground, and is employed to load the amplifier. The output signal of the operational amplifier 80 is a transmit tone generated on the line 16.

The digital to analog converter generates a signal on the output line 16 of a voltage level determined by the signals on the lines 81, 84, 87, 90 and 93. The output signal of the NAND gate 66 switches "on" a current of 15/2R amperes in the series path of the resistors 77 and 78 when the output signal is "raised"; when the output signal of the NAND gate 66 is "lowered", the current in the series path is switched "off" to zero amperes. Similarly the output signal of the NAND gate 71 switches on a current of 15/4R amperes in the series path of the resistors 82 and 83 when raised; when lowered the output signal switches off the corresponding current. The output signal of the NAND gate 72 switches on a current of 15/8R amperes in the series path of the resistors 85 and 86 when raised, and switches off the corresponding current when lowered. The output signal of the NAND gate 73 switches on a current of 15/16R amperes in the series path of the resistors 88 and 89, and switches off the corresponding current when lowered. A current of 15/32R amperes in the series path of the resistors 91 and 92 is switched on by the output signal of NAND gate 74 when raised and is switched off by the output signal of the NAND gate 74 when lowered. A constant current of 15/2R amperes in the resistor 95 is directed from the input terminal 79 to the constant voltage source 96. Because the net current toward the input terminal 79 is conducted by the resistor 97, the voltage level of the output signal on the line 16 is given by:

$$E_{16} = -I_{net}\ X(2R)$$

where $E_{16}$ is the voltage level in volts of the signal on the output line 16, and $I_{net}$ is the net current toward the input terminal 79. The net current $I_{net}$ is determined algebraically by summing the current in resistor 97, − 15/2R amperes with the total current switched "on" by the NAND gates 66, and 71–74, attributing a positive algebraic sense to the total current switched "on."

The output signals of the NAND gates 66 and 71–74 are raised or lowered according to the signals on the lines 60–64 and the line 23. When the signal on the line 23 is lowered by the tone controller 19, $I_{net}$ is zero amperes (only the NAND gate 66 switches on its associated current of + 15/2R amperes to balance the constant current − 15/2R amperes), and the output signal on the line 16 is zero volts.

Assuming the signal on line 23 is raised, the signals on the lines 60–64 control the output signals of the NAND gates 66 and 71–74. The digital input word represented by the signals on the lines 60–64 determines the voltage level of the signal on the line 16. The signal on the line 60 determines the polarity of the voltage on the line 16; when the signal on the line 60 is raised the polarity of the voltage is positive, when lowered, the polarity is negative. The signals on the lines 61–64 determine the numerical value of the voltage of the signal on the line 16 by controlling the raising or lowering of the output signals of the NAND gates 67–70 respectively. When the signal on the line 61 is raised the NAND gate 71 raises its output signal, when the signal on the line 61 is lowered, the NAND gate 71 lowers its output signal; a current of 15/4R amperes is switched on or off as heretofore explained. Similarly the output signal of NAND gate 72 is raised or lowered as the signal on the line 62 is raised or lowered. The output signal of the NAND gate 73 is raised or lowered as the signal on the line 63 is raised or lowered, and the output signal of the NAND gate 74 is raised or lowered as the signal on the line 64 is raised or lowered.

Assuming that the signal on the line 23 is raised the operation of the NAND gates and the digital to analog converter may be understood by example. If the binary address generated by the signals 54–58 is 00011, reference to the foregoing table shows that the digital input word generated on the output lines 60–64 is 11010. To represent 11010, the signal on the line 60 is raised; that on the line 61 is raised; that on the line 62 is lowered; that on the line 63 is raised; and that on the line 64 is lowered. The output signal of the NAND gate 66 is lowered, switching off its associated current. The output signal of the NAND gate 71 is raised to switch on its associated current of 15/4R amperes. The output signal of the NAND gate 72 is lowered to switch off its associated current. The output signal of the NAND gate 73 is raised to switch on its associated current of 15/16R amperes. The output signal of the NAND gate 74 is lowered to switch off its associated current. The total current switched on is $15/4R + 15/16R - 75/16R$ amperes. $I_{net}$ is determined as $- 15/2R + 75/16R = -45/16R$ amperes, and $E_{16} = 45/16R \times (2R) = 45/8 = 90/16$ volts as shown in the table.

In more detail with respect to the tone controller 19, the read-only memory 59 generates a pulse on the line 26 at the beginning of generation of a transmit tone on the line 16. The pulse on the line 26 is connected to the NAND gates 101 and 105 to initialize the three-state memory comprising the NAND gates 101, 102, and 105 in the no datum condition, wherein the output signal of the NAND gate 105 is raised; that of the NAND gate 101 is raised; and that of the NAND gate 102 is lowered. The output signals of the NAND gates 105 and 101 are connected to the NAND gate 111 by lines 109 and 112 respectively. The no datum condition causes the NAND gate 111 to lower its output signal on the line 20, to request the associated data processor 12 to present the next datum bit for transmission. If the associated data processor 12 has no datum for transmission (as heretofore explained) it generates no pulse on the lines 21 and 22, and the output signals of the NAND gates 101, 102, and 105 remain at the levels which represent the no datum condition.

If the associated data processor 12 has a datum bit for transmission of value one, it generates simultaneous positive pulses on the lines 21 and 22. The output signal of NAND gate 107 on line 108 is normally raised and is lowered concurrently with the pulse on the line 25 generated by the read-only memory of the end of generation of a transmit tone. The line 108 is connected to NAND gates 100 and 103; when the signal on the line 108 is raised by the NAND gate 107, the pulse signals generated by the associated data processor 12 changes the three-state memory to a datum one condition. The line 22 is connected to the NAND gate 100, and the line 21 is connected to both the NAND gates 100 and 103. Assuming that the signal on the line 108 is raised the simultaneous positive pulses generated on the lines 21 and 22 cause the NAND gate 100 to lower its output signal on the line 104 and the NAND gate 103 to raise its output signal on the line 106. The line 104 is connected to the NAND gates 101 and 102, and the line 106 is connected to the NAND gates 102 and 105. When the signal on the line 104 is lowered while that on the line 106 is raised, the NAND gates of the three-state memory generate output signals to represent the datum one condition, wherein the output signal of the NAND gate 105 is lowered; that of the NAND gate 101 is raised; and that of the NAND gate 102 is raised. After the pulse signals on the lines 21 and 22, the output signals of the NAND gates comprising the three-state memory remain at the levels which represent the datum one condition. The datum one condition causes the NAND gate 111 to raise its output signal on the line 20, as acknowledgment to the associated data processor 12 that the transmission datum has been accepted.

If the associated data processor 12 has a datum for transmission of value zero, it generates a positive pulse on the line 21 only. Assuming that the output signal of the NAND gate 107 is raised, the NAND gate 100 holds the signal on the line 104 raised, while the NAND gate 103 lowers the signal on the line 106, causing the NAND gates of the three-state memory to generate output signals representing the datum zero condition, wherein the output signal of the NAND gate 105 is raised that of the NAND gate 101 is lowered and that of the NAND gate 102 is raised. After the pulse signal on the line 21 the output signals of the NAND gates comprising the three-state memory continue to represent the datum zero condition. The datum zero condition causes the NAND gate 111 to raise the signal on the line 20, as acknowledgment to the associated data processor 12 that the transmission datum has been accepted.

The output signal of the NAND gate 105 is connected by the line 109 to latch 110. The output signal of the NAND gate 102 is connected by line 113 to latch 114. The line 25 is connected to the latches 110 and 114 and to the NAND gate 107. At the end of generation of a transmit tone the read-only memory 59 generates a pulse on the line 25 to cause the latches 110 and 114 to sample the levels of the signals on the lines 109 and 113 respectively. After the pulse on the line 25, the latch 110 generates a first output signal on the line 115 of level opposite the sampled signal level on the line 109, and a second output signal on the line 116 of the level similar to the sampled signal level on the line 109. After the pulse on the line 25 the latch 114 generates a signal on the line 23 of level similar to the sampled signal level on the line 113. The signal levels on the lines 23, 115 and 116 are constant between successive pulse signals on the line 25; however the signal levels may change at the time a pulse signal occurs on the line 25.

A pulse signal on the line 25 generated by the read-only memory 59 at the end of generation of a transmit tone, causes the latches 110 and 114 to sample the datum condition represented by the output signals of the three-state memory and to generate signals on the lines 23, 115, and 116 to control generation of the next transmit tone according to the datum condition stored by the three-state memory. A signal generator 117 generates a clock signal on the line 118 which oscillates at a constant frequency of $8/7 \times 9600 \times 32$ hertz, while a signal generator 122 generates a clock signal on the line 123 which oscillates at a constant frequency of $6/7 \times 9600 \times 32$ hertz. The lines 115 and 118 are connected to a NAND gate 119, which generates an output signal connected by a line 120 to a NAND gate 121. The lines 116 and 123 are connected to a NAND gate 124 which generates an output signal connected by a line 125 to the NAND gate 121. The output signal of the NAND gate 121 is a clock signal which oscillates at the frequency of signal generator 117 or 122, depending on the sampled datum condition. The output signal of the NAND gate 121 is connected by the line 24 to the tone synthesizer portion of the transmitter 15.

If the sampled datum condition is datum one, the latch 110 raises the signal on the line 115 and lowers the signal on the line 116. The latch 114 raises the signal on the line 23, to permit the tone synthesizer to generate a transmit tone. Because the signal on the line 116 is lowered, the NAND gate 124 holds the signal on the line 125 at the raised level, to isolate the line 24 from the output signal of the signal generator 122. Because the signal on the line 115 is raised, the NAND gate 119 lowers the signal on the line 120 during positive half cycles of the signal on the line 118, and raises the signal on the line 120 during negative half cycles of the signal on the line 118, so that the signal on line 120 oscillates at the same frequency as that on the line 118 but in opposite phase. For similar reasons the NAND gate 121 generates an output signal on the line 24 which oscillates at the same frequency and phase as that on the line 118.

If the sampled datum condition is datum zero, the latch 110 lowers the signal on the line 115 and raises the signal on the line 116. The latch 114 raises the signal on the line 23, to permit the tone synthesizer to generate a tranmit tone. Because the signal on the line 115 is lowered, the NAND gate 119 holds the signal on the line 120 at the raised level, to isolate the line 24 from the output signal of the signal generator 117. Because the signal on the line 116 is raised, the NAND gate 124 lowers the signal on the line 125 during positive half cycles of the signal on the line 23, and raises the signal on the line 125 during negative half cycles, so that the signal on the line 125 oscillates at the same frequency as that on the line 123, but in opposite phase. For similar reasons the NAND gate 121 generates an output signal on the line 24 which oscillates at the same frequency and phase as that on the line 123.

The tone controller 19 governs the frequency of the clock signal on the line 24 according to the datum one or datum zero condition and thereby governs the period of the generated transmit tone, as the period of the generated transmit tone is equal to the time interval over which 32 successive oscillations of the clock signal on the line 24 occur. Because the read-only memory 59 generates a pulse on the line 25 at the end of generation of a transmit tone, the frequency of the clock signal on the line 24 and thus the generated transmit tone frequency on the line 16 is changed smoothly when the transmit tone crosses upwardly through the zero axis. Immediately upon the beginning of generation of a transmit tone the read-only memory 59 generates a pulse on the line 26 to initialize the three-state memory in the no datum condition, and the tone controller 19 lowers the signal on the line 20 to request the next transmission datum from the associated data procession 12 as heretofore explained. The associated data processor 12 may generate pulse signals at any time between a pulse on the line 26 and the subsequent pulse on the line 25, to represent the next transmission datum bit. If the data processor 12 generates the pulse signals at a time exactly coincident with the pulse on the line 25, the NAND gate 107 temporarily lowers the signal on the line 108, to prevent the pulse signals from setting the three-state memory in the datum one or datum zero condition. This prevention insures that latches 110 and 114 do not sample the signals on the lines 109 and 113 in a state of change, which could cause the tone controller 19 to select an erroneous clock signal frequency for transmission to the tone synthesizer by the line 24. In this instance, the three-state memory remains in the no datum condition and the signal on the line 20 remains lowered to notify the data processor 12 that the transmission datum was not accepted.

If the sampled datum condition is no datum, the latch 110 lowers the signal on the line 115 and raises the signal on the line 116. The latch 114 lowers the signal on the line 23, to cause the digital to analog converter to generate a constant signal of zero volts on the output line 16, until a transmission datum is presented by the data processor 12. Because the signal on the line 116 is raised, the clock signal on the line 24 oscillates at the frequency of signal generator 122, causing the counter 52 to generate output signals on the lines 54–58 to address the 32 locations of the read-only memory 59 in repeated sequences. Thus the read only memory 59 continues to generate pulses on the lines 25 and 26 for the duration of the no datum condition, whereby the operation of the tone controller 19 remains synchronized with respect to that of the tone synthesizer when a transmission datum is subsequently presented by the data processor 12.

RECEIVER

Figure 6:
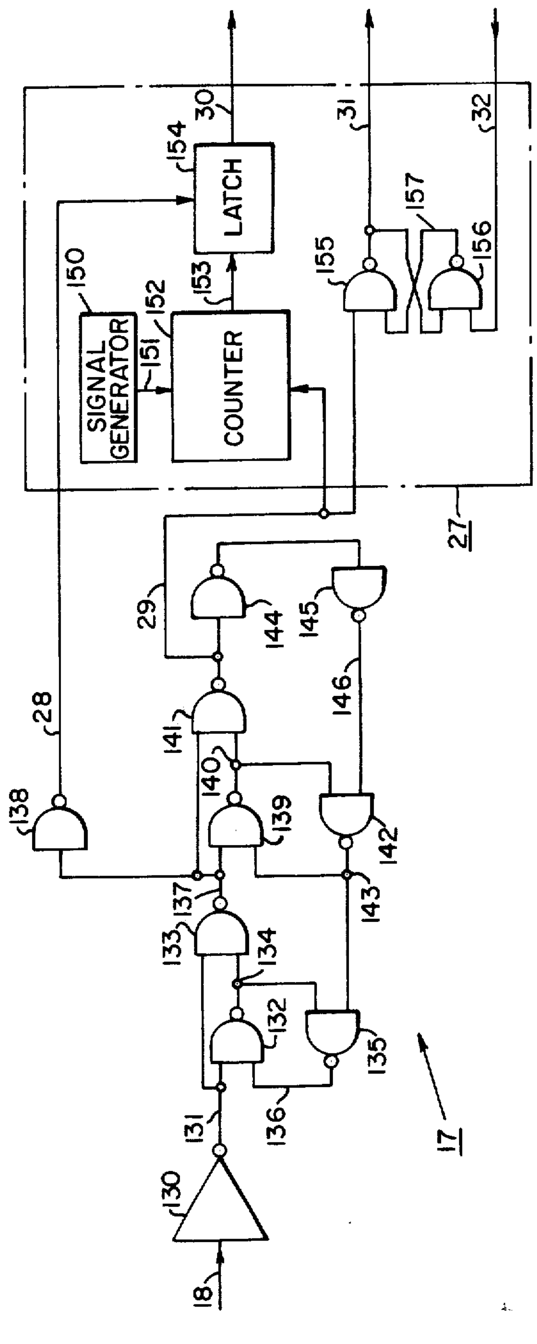
FIG. 6 is a schematic diagram of a receiver according to one embodiment of the present invention.

Referring to FIG. 6, the receiver 17 includes a mark/space discriminator portion 27 and an axis crossing detector. A received tone separated by the associated transmit/receive separator 14 (see FIG. 1) is conducted by the line 18 to the axis crossing detector. When the axis crossing detector detects a crossing of the received tone upwardly through the zero volts, it generates a pulse on line 28 followed in close succession by generation of a pulse on line 29. The lines 28 and 29 are connected to the makr/space discriminator portion 27, to synchronize the operation of the discriminator. The mark/space discriminator 27 includes a counter 152 to count oscillations of a constant frequency signal. At the beginning of a received tone, the counter 152 is reset by the pulse on the line 29, and thereafter counts upwardly oscillations of the clock signal. Counting continues for the duration of the received tone and is terminated by the subsequent pulse signal on the line 28, generated at the end of the received tone. The pulse signal on the line 28 causes the mark/space discriminator 27 to generate a signal on output line 30, to represent the datum value of the received tone. Lines 30, 31, and 32 are connected to the associated data processor 12 (see FIG. 1). The mark/space discriminator 27 generates a signal on the line 31 to notify the data processor 12 that a received datum value is available. The data processor 12 subsequently acquires the datum value represented by the signal on the line 30, and generates a signal on the line 32, to acknowledge receipt of the datum value. The signal on the output line 30 continues to represent the datum value of the received tone for a time interval equal to the duration of the subsequent received tone.

In more detail with respect to the axis crossing detector, a received tone is connected by the line 18 to amplifier 130. The output signal of the amplifier 130 is connected by line 131 to NAND gates 132 and 133. The amplifier 130 is output saturated, so that the signal on the line 131 rises quickly to a constant positive level during the positive half cycle of the received tone, and falls quickly to a constant negative level during the negative half cycle of the received tone. The output signal of the NAND gate 132 is connected by line 134 to NAND gates 135 and 133. The output signal of the NAND gate 135 is connected by line 136 to the NAND gate 132. The output signal of NAND gate 133 is connected by line 137 to NAND gate 138, which generates an output signal connected to the mark/space discriminator 27 by the line 28 and to NAND gate 139.

The output signal of the NAND gate 139 is connected by line 140 to NAND gate 141, which generates an output signal connected to the mark/space discriminator 27 by the line 29, and to NAND gate 142. The output signals of NAND gate 142 are connected by line 143 to the NAND gates 135 and 139.

NAND gates 144 and 145 are connected in series for the purpose of minor signal delay rather than logic function. The output signal of the NAND gate 141 is connected by line 29 to the NAND gate 144, and the output signal of the NAND gate 145 is connected by line 146 to the NAND gate 142.

During a negative half cycle of the received tone on the line 18, the signal on the line 131 is lowered by the amplifier 130, and the NAND gates comprising the axis crossing detector generate output signals having the following levels:

| | | | |
|---|---|---|---|
| Gate 132 | raised | Gate 144 | lowered |
| Gate 133 | raised | Gate 145 | raised |
| Gate 138 | lowered | Gate 142 | raised |
| Gate 139 | lowered | Gate 135 | lowered |
| Gate 141 | raised | | |

In the above initial state, the signal on the line 28 is lowered while the signal on the line 29 is raised.

When the received tone crosses upwardly through the zero voltage axis, the signal on the line 131 is raised by the NAND gate 130. In time succession the output signals of the NAND gates comprising the axis crossing detector change as follows:

| | |
|---|---|
| Gate 133 from raised to lowered | Gate 142 from raised to lowered |
| Gate 138 from lowered to raised | Gate 135 from lowered to raised |
| Gate 139 from lowered to raised | Gate 132 from raised to lowered |
| Gate 141 remains raised | Gate 133 from lowered to raised |
| Gate 144 remains lowered | Gate 138 from raised to lowered. |
| Gate 145 remains raised | |

In the above succession of changes, the signal on the line 28 is raised and lowered shortly thereafter by the NAND gate 138 to generate a positive pulse signal to synchronize the mark/space discriminator 27.

The following succession of output signal changes completes the response of the axis crossing detector to the raising of the signal on the line 131:

Gate 131 from raised to lowered
Gate 134 from lowered to raised
Gate 135 from raised to lowered
Gate 142 from lowered to raised
Gate 139 from raised to lowered
Gate 141 from lowered to raised
Gate 144 from raised to lowered
Gate 145 from lowered to raised.

The signal on the line 29 is lowered and raised shortly thereafter by the NAND gate 141, to generate a negative pulse signal to synchronize the mark/space discriminator 27. In summary, when the received tone on the line 18 crosses upwardly through the zero voltage axis, the axis crossing detector generates a first positive pulse signal on the line 28 followed closely in time by a second negative pulse signal on the line 29. These pulses occur essentially instantaneously after the received tone crosses upwardly through zero volts.

At the next crossing of the received tone downwardly through the zero voltage axis, the signal on the line 131 is lowered. In response, the NAND gate 132 raises the signal on the line 134 and the NAND gate 135 lowers the signal on the line 136. However, the output signal of the NAND gate 133 remains raised; as a result, no pulses are generated on the lines 28 and 29. The detector is now in the initial state above described, ready to respond as above described to the next crossing of the received tone upwardly through the zero voltage axis.

Referring to the mark/space discriminator 27, signal generator 150 generates an oscillating output signal of constant predetermined center line frequency which is connected by line 151 to the counter 152. Center line frequency is 32 × 9600 hertz. The counter 152 is a five-bit counter which counts upwardly oscillations of the signal on the line 151. The line 29 is connected to the counter 152 so that the counter resets in response to a negative pulse on the line 29. The signal representing the state of the most significant bit of the counter 152 is connected by line 153 to latch 154. When the state of the counter bit is one the signal on the line 153 is raised; when the state of the counter bit is zero the signal on the line 153 is lowered. The line 28 is connected to the latch 154. When a positive pulse occurs on the line 28, the latch 154 samples the level of the counter output signal on the line 153 and generates a signal on the line 30 of the same level as that on the line 153. The signal level on the line 30 remains constant between successive pulse signals on the line 28. The line 30 is connected to the associated data processor 12 (see FIG. 1), to which the signal level on the line 30 represents the value of the received datum, being high for a value one and low for a zero value.

The line 29 also is connected to NAND gate 155. The output signal of NAND gate 155 is connected to data processor 12 by the line 31 and to NAND gate 156. The signal on the line 31 is raised by the NAND gate 155 to notify the data processor 12 of the availability of the value of a received datum, as represented by the signal on the line 30. The line 32 is connected to the NAND gate 156, and the output signal of the NAND gate 156 is connected by line 157 to the NAND gate 155. Normally the signal on the line 32 is raised by the data processor 12; it is lowered momentarily in a negative pulse by the data processor to acknowledge receipt of a datum value on the line 30.

The counter 152 resets in response to a pulse on the line 29 at the beginning of a received tone and immediately thereafter counts upwardly oscillations of the signal on the line 151. Counting continues until a pulse occurs on the line 28, which causes the latch 154 to sample the level of the signal on the line 153. Immediately thereafter a pulse on the line 29 resets the counter 152 and another counting interval begins. The length of a counting interval is thereby determined by the time duration between successive pulses on the line 29, and is equal to the period of the received tone on the line 18. As explained with regard to the transmitter, the frequency of the received tone corresponding to a datum of value zero is 6/7 × 9600 hertz (the "space" frequency), while that corresponding to a datum of value one is 8/7 × 9600 hertz ("mark" frequency). The center line frequency is 9600 × 32 hertz. If signal oscillations on the line 151 are counted for the period of a received tone of the space frequency, which represents a datum bit of value zero, then 7 × 32/6 = 37½ oscillations are counted. If signal oscillations on the line 151 are counted for the period of a received tone of the mark frequency, which represents a datum bit of value one, then 7 × 32/8 = 28 oscillations are counted. Because the counter 152 has five bits, the most significant bit (corresponding to $2^4$) is raised on the sixteenth count and remains raised through the thirty-first count. On the thirty-second count all bits of the counter 152 are lowered. If the received tone is of the space frequency then the most significant counter bit is lowered at the end of the counting interval, and the latch 154 samples the low level of the signal on the line 153 and lowers the signal on the line 30 to represent a received datum of value zero. If the received tone is of the mark frequency, the most significant counter bit is raised at the end of the counting interval, and the latch 152 samples the raised level of the signal on the line 153 and raises the signal on the line 30 to represent a received datum of value one.

The above discussion wherein the space and mark frequencies are 6/7 × 9600 and 8/7 × 9600 respectively is illustrative, and other frequencies may be used. Numerically closer frequencies favor conservation of channel bandwidth, while greater numerical separation of the frequencies raises the immunity of the receiver 17 to the effects of frequency drift and phase shift.

The NAND gates 155 and 156 respond to the pulse signal on the line 29 and the pulse signal on the line 32. Immediately after the signal level on the line 153 is sampled by latch 154, a negative pulse on the line 29 resets the counter 152. The pulse on the line 29 also causes the NAND gate 155 to raise the signal on the line 31, while the NAND gate 156 lowers the signal on the line 157. Because the signal on the line 32 is normally raised, the signal on the line 157 remains lowered and the signal on the line 31 remains raised after the pulse on the line 29. The signal on the line 31 when raised notifies the data processor 12 that a received datum value is present on the line 30. To acknowledge receipt of the datum value, the data processor 12 generates a negative pulse on the line 32. The pulse on the line 32 causes the NAND gate 156 to raise the signal on the line 157 and the NAND gate 155 to lower the signal on the line 31. Because the signal on the line 29 is normally raised, the output signal levels of the NAND gates 155 and 156 remain in their respective states after the negative pulse on the line 32. Thus the signal on the line 31 remains lowered until the next pulse signal on the line 29. When the latter pulse occurs the latch 154 already holds the value of a newly received datum, and the signal on the line 31 is raised again to notify the data processor 12 that a new datum value is available on the line 30.

In the mark/space discriminator 27 the latch 154 stores the value of the received datum between successive pulses on the line 28. Therefroe the data processor 12 may acquire the received datum value at any point of time in the interval between the successive pulses on the line 28. This arrangement is ideally suited to a real-time data processor but is not limited thereto.

While the present invention has been set forth in a specific embodiment thereof, it is to be understood as illustrative of the broad principles of the invention and that various changes in the form and details may be made therein without departing from the spirit and scope of the invention.

We claim:

1. Full duplex frequency shift keyed communications apparatus for communication of digital data over a two conductor transmission line having characteristics impedance terminations, which line may carry a signal to be received by such apparauts, comprising:

a transmitter to generate a transmit tone comprising one cycle of a repetitive signal in response to a transmission datum bit, and to control the frequency of the generated tone at one of two predetermined values in accordance with the transmission datum bit value;

a transmit/receive separator including means for generating a current signal having a fixed proportionality with a transmit tone that is generated by said transmitter; means responsive to the generated current signal for generating a voltage signal across the conductors of the transmission line having a fixed proportionality with the current signal, so that the composite signal accross the conductors is the sum of the generated voltage signal with a signal which may be carried to the apparatus; and means responsive to the transmit tone and to the composite signal across the conductors of the transmission line for subtracting the transmit tone from the composite signal to separate a received tone, the received tone comprising one cycle of a repetitive signal having a first or second frequency corresponding to the bit value of a received datum; and a receiver responsive to each received tone separated by the transmit/receive separator to detect the frequency of a received tone and to generate a signal in accordance with the datum bit value corresponding to the detected frequency of the received tone.

2. Communication apparatus according to claim 1 wherein the transmit and received tones each comprise one cycle of a sinusoidal signal.

3. Communication apparatus according to claim 2 wherein said one cycle of a sinusoidal signal begins and ends at zero signal level.

4. Communication apparatus according to claim 3 wherein the transmitter generates a third constant voltage signal when a transmission datum bit is absent.

5. Communications apparatus according to claim 1 wherein the receiver includes means to store the detected datum bit value of a first received tone for a time interval equal to the duration of a subsequent second received tone, whereby an external data processor may acquire the datum bit value of the first received tone at a point of time during the second received tone.

6. Communications apparatus according to claim 1 wherein the transmitter includes means to store the value of a second datum bit to be transmitted after generation of a transmit tone in accordance with a first datum bit being transmitted, whereby a second transmission datum bit may be furnished by an external data processor at a point of time during generation of a tone corresponding to the first transmission datum bit.

7. Full duplex frequency shift keyed communications apparatus for communication of digital data over a two-conductor transmission line having characteristic impedance terminations, which line may carry a signal to be received by such apparatus, comprising:

a transmitter to generate a transmit tone comprising one cycle of a repetitive signal in response to a transmision datum bit, and to control the frequency of the generated tone at one of two predetermined values in accordance with the transmission datum bit value, said transmitter to generate a third constant signal when a transmission datum bit is absent;

a transmit/receive separator to generate a voltage signal across the transmission line conductors having a constant proportionality with the transmit tone, so that the composite signal across the conductors is the sum of the generated voltage signal with a signal which may be carried to the apparatus by the transmission line, and to separate a received tone by subtracting the transmit tone from the composite signal, the received tone comprising one cycle of a repetitive signal having a first or second predetermined frequency in accordance with the bit value of a received datum; and a receiver responsive to each received tone separated by the transmit/receive separator to detect the frequency of the received tone and to generate a signal in accordance with the datum bit value corresponding to the detected frequency of the received tone.

8. Communications apparatus according to claim 7 wherein the transmit and received tones each comprise one cycle of a sinusoidal signal.

9. Communications apparatus according to claim 8 wherein a sinusoidal signal cycle begins and ends at zero signal level.

10. Communications apparatus according to claim 7 wherein said transmitter comprises:

a first signal generator to generate a first clock signal having a fixed frequency of oscillation;

a second signal generator to generate a second clock signal having a fixed frequency of oscillation distinguishable from the frequency of the first clock signal;

first means responsive to an oscillating input signal for generating a transmit tone having a time duration equal to a time interval over which a predetermined number of oscillations of the input signal occurs; and second means responsive to the transmission datum bit for coupling one of the first and second clock signals as the oscillating input signal to said first means in accordance with the transmission datum bit value, and for controlling said first means to generate the third signal when a transmission datum bit is absent.

11. Communications apparatus according to claim 10 wherein said first means includes:

a counter to count oscillations of the clock signal that is coupled to said second means, and to generate output signals representative of the number of oscillations counter; and means connected to the output signals of said counter for generating a transmit tone in response to a predetermined sequence of oscillation counts.

12. Communications apparatus according to claim 11 wherein said means for generating a transmit tone includes:

a read only memory responsive to the output signals of said counter to generate a sequence of digital output numbers in response to the predetermined sequence of oscillation counts, wherein each oscillation count causes generation of a corresponding predetermined digital output number, said read only memory having a plurality of output lines to carry output signals representative of a digital output number when such number is generated by said read only memory; and a digital to analog converter connected to the output lines of said read only memory to generate an analog output signal having a signal level that is determined by the digital output number that is represented by the output signals of said read only memory, whereby the predetermined sequence of oscillation counts causes said digital to analog converter to generate a corresponding sequence of analog output signals comprising a transmit tone.

13. Communications apparatus according to claim 12 wherein the generated analog output signals stepwise approximate a sinusoidal signal cycle.

14. Communications apparatus according to claim 13 wherein the generated output signals are filtered to reduce step differences between successive output signal levels, whereby a transmit tone is a substantially smooth sinusoidal signal cycle.

15. Communications apparatus according to claim 14 wherein a transmit tone begins and ends at zero signal level.

16. Communications apparatus according to claim 7 wherein said transmitter includes means to store the value of a second datum bit for transmission after generation of a transmit tone corresponding to a first datum bit being transmitted, whereby the second datum bit may be furnished by an external data processor at a point of time during generation of a transmit tone corresponding to the first datum bit.

17. Communications apparatus according to claim 7 wherein said receiver comprises:

means responsive to the received tone to detect the time duration of the received tone;

a signal generator to generate an oscillating signal having a fixed frequency of oscillation; and a counter responsive to said detecting means to count the number of oscillations of the fixed frequency oscillating signal that occur during the detected time duration of the received one, whereby the state of a predetermined counter bit at the end of the received tone represents the bit value corresponding to the received tone.

18. Communications apparatus according to claim 7 wherein each of the transmit and the received tones comprises one cycle of a sinusoidal signal which cycle begins and ends at zero signal level, and said receiver includes:

an axis crossing detector to detect the time duration of the received tone as defined by successive crossings of the received tone upwardly through zero signal level;

a signal generator to generate an oscillating signal having a fixed frequency of oscillation;

a counter responsive to the axis crossing detector to count upwardly from zero the oscillations of the fixed frequency oscillating signal that occur during the detected time duration of the received tone; and a latch responsive to the axis crossing detector to generate a signal in accordance with the state of a predetermined bit of said counter at the end of the received tone, whereby the signal generated by said latch defines the bit value corresponding to the received tone.

19. Communications apparatus according to claim 2 wherein said receiver includes means to store the datum bit value corresponding to a first received tone for the time interval of a subsequent second received tone, whereby an external data processor may acquire the datum bit value corresponding to the first received tone at a point of time during the second received tone.

* * * * *